US006381664B1

United States Patent
Nishtala et al.

(10) Patent No.: US 6,381,664 B1
(45) Date of Patent: *Apr. 30, 2002

(54) SYSTEM FOR MULTISIZED BUS COUPLING IN A PACKET-SWITCHED COMPUTER SYSTEM

(75) Inventors: Satyanarayana Nishtala, Cupertino; William C. Van Loo, Palo Alto; Zahir Ebrahim, Mountain View, all of CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/597,963

(22) Filed: Jun. 20, 2000

Related U.S. Application Data (63) Continuation of application No. 08/912,772, filed on Aug. 18, 1997, now Pat. No. 6,101,565, which is a continuation of application No. 08/674,424, filed on Jul. 1, 1996, now abandoned.

(51) Int. Cl.[7] .............................................. G06F 13/00
(52) U.S. Cl. ..................... 710/127; 710/129; 710/132; 710/38; 710/66
(58) Field of Search ................ 710/126–132, 710/38, 62–66

(56) References Cited

U.S. PATENT DOCUMENTS

| | | | | | |
|---|---|---|---|---|---|
| 4,228,503 A | * | 10/1980 | Waite et al. | ................. | 711/121 |
| 4,309,754 A | * | 1/1982 | Dinwiddie, Jr. | ............. | 710/127 |
| 4,683,534 A | * | 7/1987 | Tietjen et al. | ................ | 710/127 |
| 4,716,527 A | * | 12/1987 | Graciotti | ...................... | 710/127 |
| 4,860,198 A | * | 8/1989 | Takenaka | ..................... | 710/127 |
| 4,949,246 A | * | 8/1990 | O'Dell et al. | ................ | 709/206 |
| 5,036,459 A | * | 7/1991 | Haan et al. | .................. | 709/237 |
| 5,043,935 A | * | 8/1991 | Taniai et al. | ................... | 710/66 |
| 5,113,369 A | * | 5/1992 | Kinoshita | .................... | 710/127 |
| 5,165,037 A | * | 11/1992 | Culley | ......................... | 710/127 |
| 5,220,651 A | * | 6/1993 | Larson | .......................... | 710/8 |
| 5,280,598 A | * | 1/1994 | Osaki et al. | ................. | 710/127 |
| 5,319,753 A | * | 6/1994 | MacKenna et al. | ........... | 710/48 |
| 5,345,559 A | * | 9/1994 | Okazaki et al. | ................ | 710/53 |
| 5,388,227 A | * | 2/1995 | McFarland | ................... | 710/127 |
| 5,394,528 A | * | 2/1995 | Kobayashi et al. | .......... | 710/127 |

(List continued on next page.)

Primary Examiner—Sumati Lefkowitz
(74) Attorney, Agent, or Firm—Conley, Rose & Tayon, PC; B. Noël Kivlin (57) ABSTRACT

A data transfer control system for a computer system having a packet-switched data bus, for controlling the transfer of data words from a device having one bus width to a device having a different bus width. The first bus may be the master bus, and the second bus is a bus of a functional unit, such as a memory or other device, connected to the computer system and coupled to the master bus. When the second bus is smaller than the first bus, the data transfer control system accommodates this by transferring only partial words per clock cycle to the second bus, effectively delaying the transference of data to a rate that the second bus can handle. The transfer rate factor is substantially equal to the ratio of the second bus width to the first bus width. In an alternative embodiment, the data transfer control system transfers the data words at substantially the full rate available, given the computer system's processor or clock speed and the width of the master bus, and the words are buffered before transference to the second bus. The speed of transference to the buffer is then not limited by the size of the second bus, but only by the size of the buffer, which preferably has an input bus at least as wide as that of the master bus. The system accommodates functional units of different sizes all to be couple to a master bus of a given size, where the different sizes may be larger or smaller than the master bus size, and accordingly the functional units can be built with optimal bus sizes for their particular functions without having to conform to a perhaps inappropriate, inefficient or expensive or wasteful master bus size.

21 Claims, 5 Drawing Sheets

U.S. PATENT DOCUMENTS

| | | | | |
|---|---|---|---|---|
| 5,423,009 A | * | 6/1995 | Zhu | 710/127 |
| 5,428,763 A | * | 6/1995 | Lawler | 710/127 |
| 5,428,799 A | * | 6/1995 | Woods et al. | 710/266 |
| 5,430,849 A | * | 7/1995 | Banks | 710/38 |
| 5,454,084 A | * | 9/1995 | Uchikoga | 710/101 |
| 5,471,632 A | * | 11/1995 | Gavin et al. | 710/104 |
| 5,509,126 A | * | 4/1996 | Oprescu et al. | 710/127 |
| 5,526,495 A | * | 6/1996 | Shibata et al. | 710/127 |
| 5,537,624 A | * | 7/1996 | Whitesell | 710/128 |
| 5,537,659 A | * | 7/1996 | Nakao | 710/127 |
| 5,548,766 A | * | 8/1996 | Kaneko et al. | 710/127 |
| 5,548,786 A | * | 8/1996 | Amini et al. | 710/22 |
| 5,553,244 A | * | 9/1996 | Norcross et al. | 710/100 |
| 5,559,969 A | * | 9/1996 | Jennings | 710/127 |
| 5,590,287 A | * | 12/1996 | Zeller et al. | 710/127 |
| 5,594,877 A | * | 1/1997 | Lentz et al. | 710/126 |
| 5,630,099 A | * | 5/1997 | MacDonald et al. | 711/172 |
| 5,664,122 A | * | 9/1997 | Rabe et al. | 710/128 |
| 5,689,659 A | * | 11/1997 | Tietjen et al. | 710/127 |
| 5,761,456 A | * | 6/1998 | Titus et al. | 710/127 |
| 5,768,546 A | * | 6/1998 | Kwon | 710/127 |
| 5,781,918 A | * | 7/1998 | Lieberman et al. | 711/5 |
| 5,911,053 A | * | 6/1999 | Pawlowski et al. | 710/127 |

* cited by examiner

SYSTEM FOR MULTISIZED BUS COUPLING IN A PACKET-SWITCHED COMPUTER SYSTEM

This application is a con of Ser. No. 08/912,772 filed Aug. 18, 1997 U.S. Pat. No. 6,101,565, which is a con't Ser. No. 08/674,424 filed Jul. 1, 1996 now abandoned.

BACKGROUND OF THE INVENTION

The present invention relates to a bus architecture for a packet-switched computer system which accommodates master, slave and memory devices having buses of various sizes, different from one another and different from the size of the system bus.

Computers are being designed today and for the foreseeable future with ever greater bus sizes, to handle the increasing throughput possible with very fast microprocessors. Typically, the bus architecture in a computer system is sized to accommodate the CPU, to allow for very fast transfers. For example, in today's workstations a databus width of 144 bits is common in highend machines, while in the next generation of systems, databus widths of 288 bits will be used.

In today's systems, a bus having a width of a given number of bits requires that all functional units connected to the bus interface to that entire bus width. However, many devices are not designed to use the entire bus width, and hence there is waste of unused bandwidth. It is wasteful and expensive to design the functional units to accommodate the entire bus width when they cannot take advantage of it. (A reverse situation can also occur: functional devices such as memory may have bus widths larger than the databus width.)

A new type of system is needed wherein a large bus width does not require that functional units coupled to it be of the same bus size, and in particular that allows devices of smaller bus size to be coupled to a large-databus architecture without loss of data or inefficiencies through the loss of clock cycles or transmission of data that go unused because of bus size incompatibility.

Such a system must also accommodate devices coupled to the system bus that have bus sizes that are larger than that of the system bus.

SUMMARY OF THE INVENTION

A system controller for a packet-switched computer system is provided with subsystems for adapting the transference of data words from a large system bus to a smaller device bus, and additionally to a larger device bus. A bus device table is provided, which includes information about the data bus width for each connected device. The system controller receives a request to transfer data from a master device such as the processor to a slave device, which may be any device that can receive data.

The system controller determines the size of the slave's bus, and if the slave bus is smaller than the master's bus then the system controller adapts the transfer rate accordingly by sending data to the slave device at a rate which is suitable for its bus size. Alternatively, a data buffer is provided and the system controller sends the data at substantially the full rate for its bus to the buffer, and then transfers the data from the buffer to the slave device. This allows for faster transfers of data out of the master device, and frees up the master's bus faster for use in other data transfers.

The system controller or other subsystem can effect the transfer of data from the buffer to the slave device while also effecting further transfers of data over the master's bus, thus achieving, from the point of view of the system controller, data transfers to the slave device—or its associated buffer—at a rate limited only by the master's bus width and the buffer size, and independent of the bus size of the slave device.

The invention thus provides for fast data transfers from a wide master's bus even to devices having narrower buses, and accommodates a broad range of device bus widths. Devices thus need not have the same bus width as the master's bus, providing economies and efficiency in their designs.

DESCRIPTION OF THE PREFERRED EMBODIMENTS

The present invention will be described in the setting of a packet-switched architecture designed and implemented by applicant Sun Microsystems, Inc. Applicant has filed related patent applications that provide useful background and an appropriate environment for the present invention, but whose details are not necessary portions invention. These patent applications include "Packet Switched Cache Coherent Multiprocessor System", by Ebrahim et al., U.S. Ser. No. 08/415,175 filed Mar. 31, 1995; and "Method and Apparatus for Flow Control in a Packet-Switched Computer System", by Ebrahim et al., U.S. Ser. No. 08/414,875 filed Mar. 31, 1995. Both of these patent applications relate to applicant's Ultrasparc Architecture (UPA), which is described fully in the document UPA Interconnect Architecture, by Bill van Loo, Satya Nishtala and Zahir Ebrahim. Sun Microsystems, Inc.'s internal release version 1.1 of the UPA Interconnect Architecture has been submitted as Appendix A to the '175 application. Each of the foregoing (applications and UPA Interconnect Architecture) is incorporated herein by reference.

Figure 1:
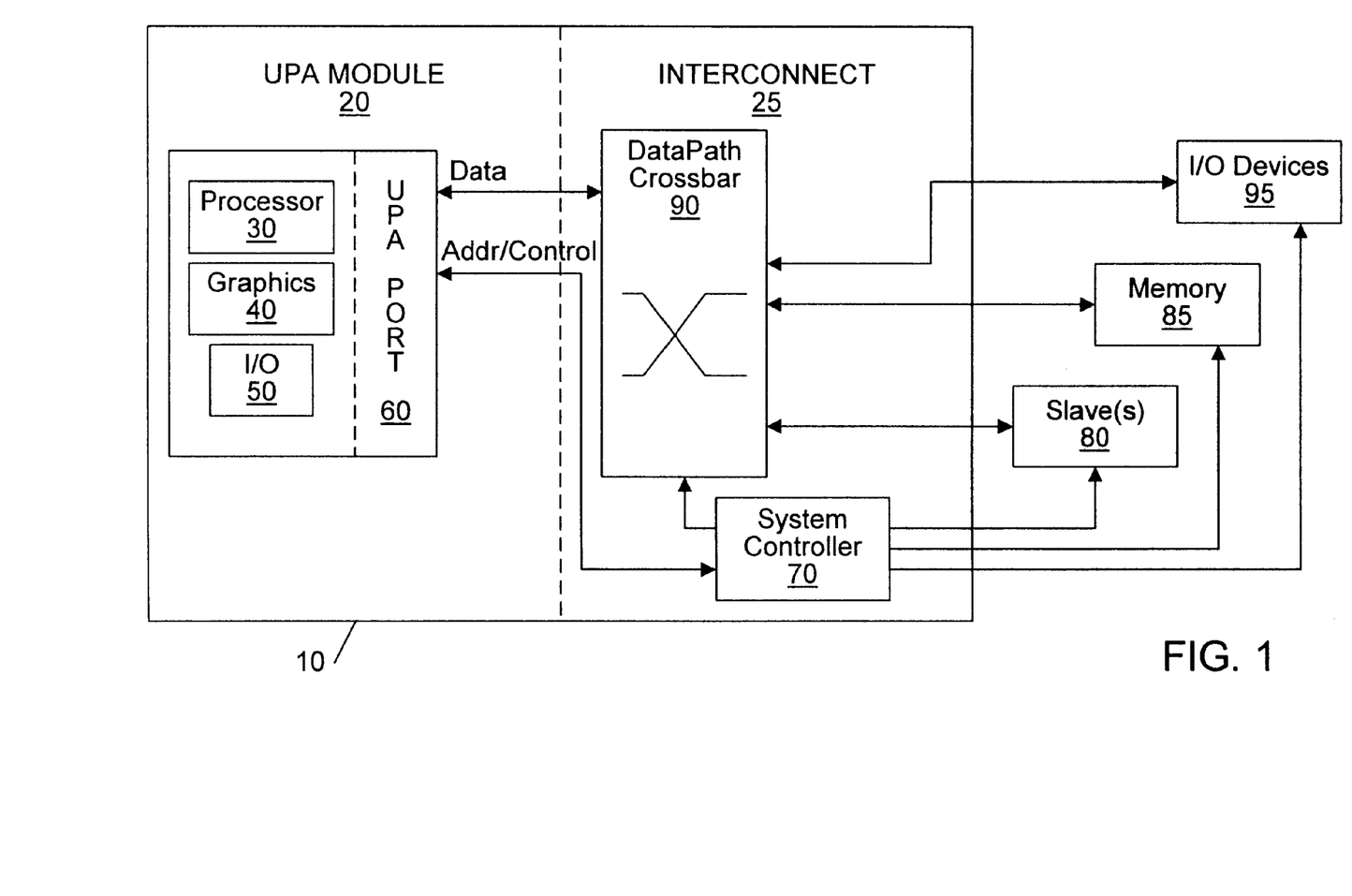
FIG. 1 is a block diagram of a preferred embodiment of a computer system incorporating the present invention.

FIG. 1 is a top-level block diagram of a computer system 10 incorporating the present invention. System 10 includes a UPA module 20 and an interconnect network or module 25, which in different embodiments of the invention may or may not be connected to the data path. The UPA module may include such devices as a processor 30, a graphics unit 40, and/or an I/O unit 50. Other units may be included, and act as the master units for the purposes of the present invention. A master interface is defined as the interface for any entity initiating transaction requests; examples of such masters are a CPU making memory requests, or an I/O channel and bridges making DMA (direct memory access) requests.

In general, in this application a master is exemplified by a processor. However, a master may be any transaction-requesting device, whether or not it includes a microprocessor. Similarly, a "slave" refers herein to any device that can accept a transaction request, including both memory and non-memory devices, etc., and including devices such as processors and I/O controllers that may themselves act as masters.

For the purposes of this invention, a "transaction" may be defined as a request packet issued by a master, followed by an acknowledgment packet (not necessarily a full packet, depending upon the particular implementation) from the recipient immediately downstream. There may or may not be a data transfer accompanying a request packet, and the data transfer may either occur on the same set of wires as the request packet, or on separate datapath wires. These details are not important to the present invention, but for background an exemplary embodiment may be found in the description in connection with FIGS. 4–7 of the '875 patent application cited above.

A UPA port 60 couples the module 20 to a system interconnect controller (SC) 70, which is in turn coupled to one or more slave interface(s), not separately shown; a slave interface forms a part of each of one to many functional devices 80–85–90. The slave interface may thus be an interface for memory (such as main memory, which may be memory 85), an I/O interface, a graphics frame buffer, one or more bridges to other interconnection networks, or even a CPU which is receiving transactions to be serviced. In general, any device that accepts transaction requests for servicing may be given a slave interface in accordance with the invention, such as conventional memory device(s) 85 and/or standard input/output (I/O device(s) 95, or any other slave device 80.

In a preferred embodiment, the UPA interface 60 is carried on the main processor chip, and the system controller 70 and slave interface are on the motherboard, though many variations are possible. More generally, each master (whether a processor or some other device) has a UPA master interface, and each slave includes a UPA slave interface. The system controller in each case resides with the system.

A datapath crossbar 90 is also included in the interconnect module 25, and is coupled to the slave interface(s), the system controller 70, and the ports 60. The datapath crossbar may be a simple bus or may be a more complicated crossbar. (The UPA ports 60 may be configured as part of either the UPA module 20 or the interconnect module 25.) The datapath unit 90 is used to transmit read and write data in a manner to be described below.

One or more I/O devices 95 forming part of the system 10 are provided for user interface, data output, etc.; these various slave devices may include RAM, ROM, disk drives, monitors, key-boards, track balls, printers, etc. They are coupled into the interconnect module 25 via the slave interfaces. The "slave" designation means in this case only that such devices accept requests from one or more master devices and fulfill those requests.

The interconnection network may in general take the form of a number of different standard communication topologies that interconnect masters and slaves, such as a point-to-point link, a single bus or multiple buses, or switching fabrics. The interconnect may employ any of a number of conventional mechanisms for switching the transaction request to a slave using one or more signal paths, and the switching may be based either on the addressing information contained in the transaction request packet, or on another protocol not necessarily dependent on the contents of the request packet. There may be any amount of buffering, or no buffering, in the interconnect.

The preferred embodiment(s) of the invention shown in FIG. 1 (and FIG. 2; see discussion below) have a centralized controller that connects to all masters and all slaves, and consequently has complete visibility into system request and data traffic. An alternative embodiment involves the use of distributed controllers, in which case it is desirable to maintain visibility, and in certain designs a high-capacity queue size may be needed.

Figure 2:
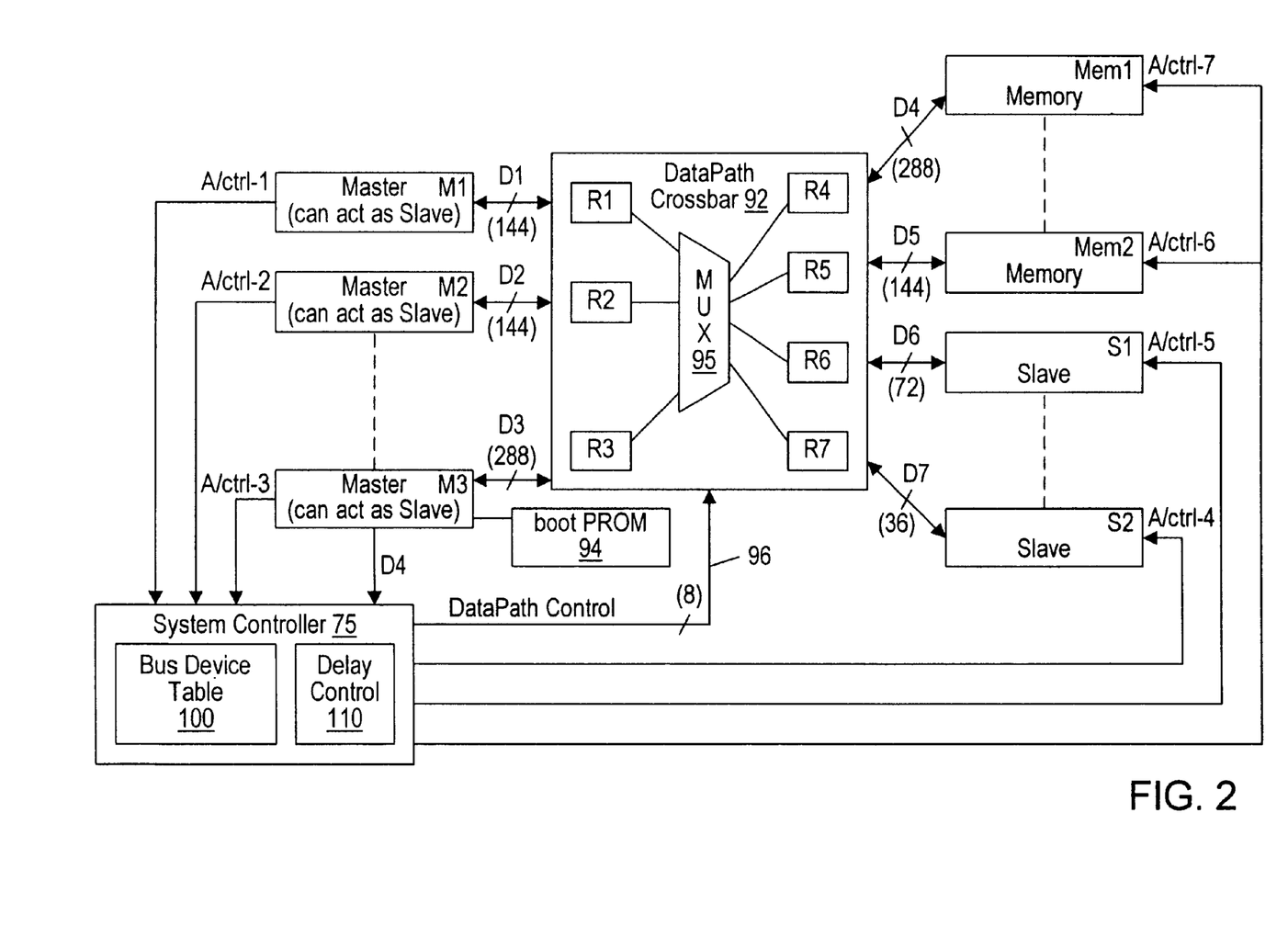
FIG. 2 is a block diagram of a more generalized embodiment of a computer system incorporating the invention.

FIG. 2 shows a more generalized block diagram of a system according to the invention. Here, there are multiple masters (three exemplary masters M1–M3 being shown). These masters may act in certain circumstances as slaves. For instance, if M1 is a processor and M3 is an I/O controller, then M3 will often act as a slave to M1, as in the initialization procedure described below. On the other hand, during a DMA operation, the I/O controller M3 will act as a master to a memory device, such as any of one to many memories represented as Mem1 . . . Mem2 in FIG. 2.

Slave devices S1 . . . S2 (which may be one, several or many slave devices) are also provided, and the masters, memories and slaves are coupled via a system controller 75 in the same fashion as the system controller 70 is coupled to the master and slave(s) in FIG. 1. The SC 75 is coupled via a datapath control bus 96 to a datapath crossbar (or interconnect) 92, as with the datapath crossbar 90 in FIG. 1. The control bus 96 will typically be much narrower than the system or data buses; e.g. in a preferred embodiment of applicant's system, the datapath is 72 or 144 bits wide, while the SC datapath control bus may be only 8 bits wide.

For each master device M1–M3, the datapath crossbar 92 includes an input register R1–R3, respectively. A multiplexer (MUX) 95 is provided to multiplex the data from the masters to the slave devices as needed, via output registers R4–R7, one per slave device (or output databus D4–D7). Of course, the data may travel from the slaves to the masters; the nomenclature "input" and "output" is for convenience, and these terms should be taken interchangeably. The MUX 95 and registers R1–R7 operate in a manner to be discussed below.

As indicated above, the SC 75 has complete visibility into all masters, slaves, and memory. The system controller may or may not be directly on the datapath, but should have control over and visibility to the datapath, and information about or visibility into the sizes of the buses of the various functional units M1 . . . M3, Mem1 . . . Mem2 and S1 . . . S2.

The SC, masters, memories and slaves in FIG. 2 are interconnected by address/control (A/ctrl) lines as shown, which may be unique (dedicated, point-to-point links) address/control lines or may be bused together. Data may also be bused or used point-to-point links. Address/control and data lines/buses may share the same links, such as by providing shared address/data buses.

A boot PROM 94 is connected by a bus to the I/O controller M3, which reads it upon startup to initialize the system in a conventional manner (e.g. to initialize the CPU, registers, etc.), and in addition to initialize the queues, registers and counters of the present invention. The initialization procedure is not central to the present invention, but is described in detail in connection with FIG. 4 of the '875 patent application cited above.

When a master device such as a processor, e.g. M1 in FIG. 2, requests a data (or instruction) transfer to a functional unit such as another processor (e.g. M2), memory (Mem1 . . . Mem2) or another device (S1 . . . S2), the system controller (SC) 75 needs to have information about the size of the bus of the functional unit. This is provided in one embodiment by a bus device table 100 in the SC 75; each functional unit has a device ID, and these are correlated with information about the respective bus sizes for the devices. The bus size information can be stored in a ROM of the functional unit, which the SC reads upon initialization or upon some other trigger, after the functional unit is connected to the system. Alternatively, logic and software may be provided for the SC 75 to automatically determine the bus size of a given device after it is connected to the system, and to store that information locally. Various manners providing the information to the SC may be used with equivalent results for the purposes of the invention.

Figure 3A:
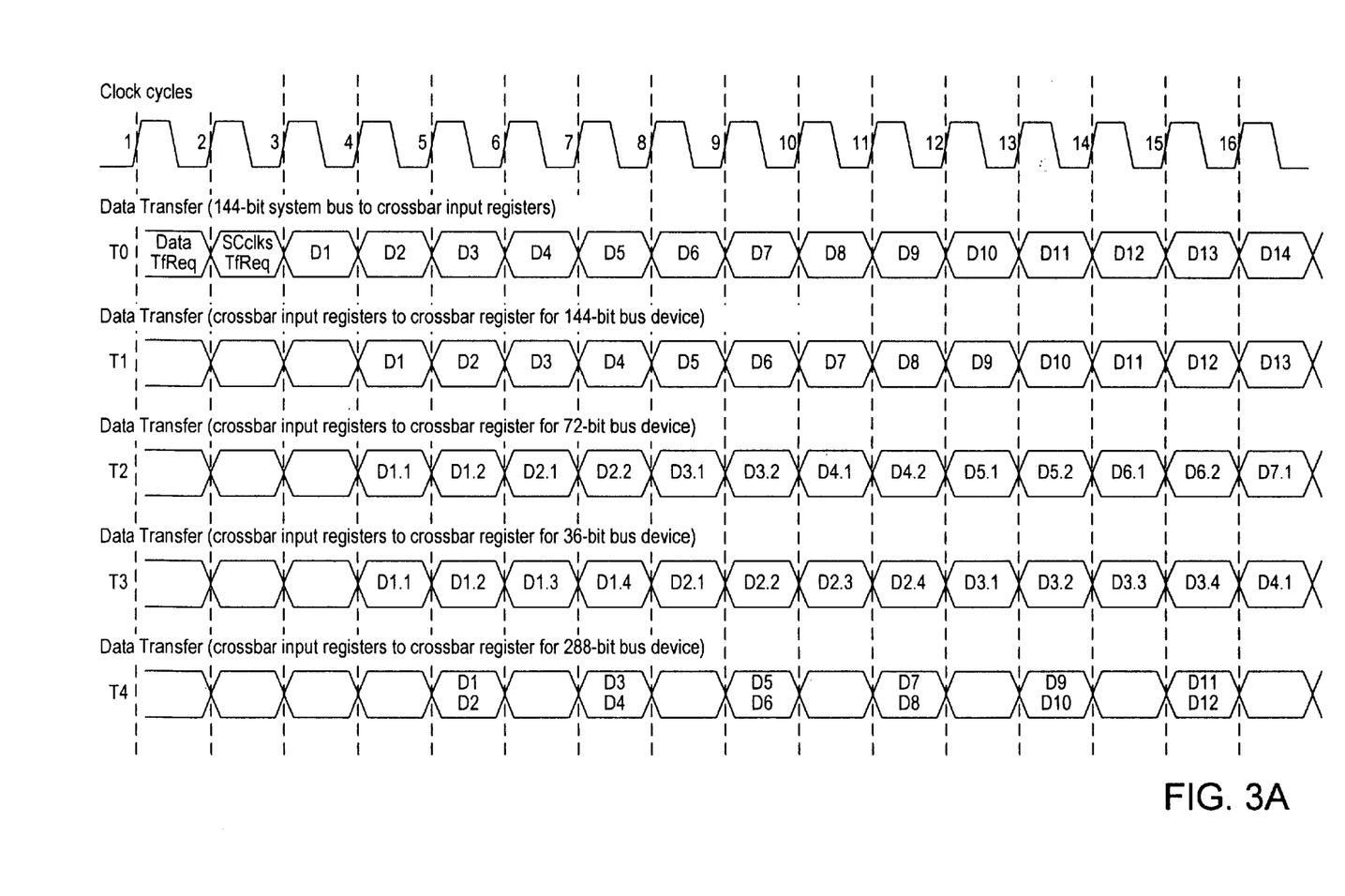
FIGS. 3–3A are timing diagrams illustrating the timing of data transfers in the system of the invention.
Figure 3B:
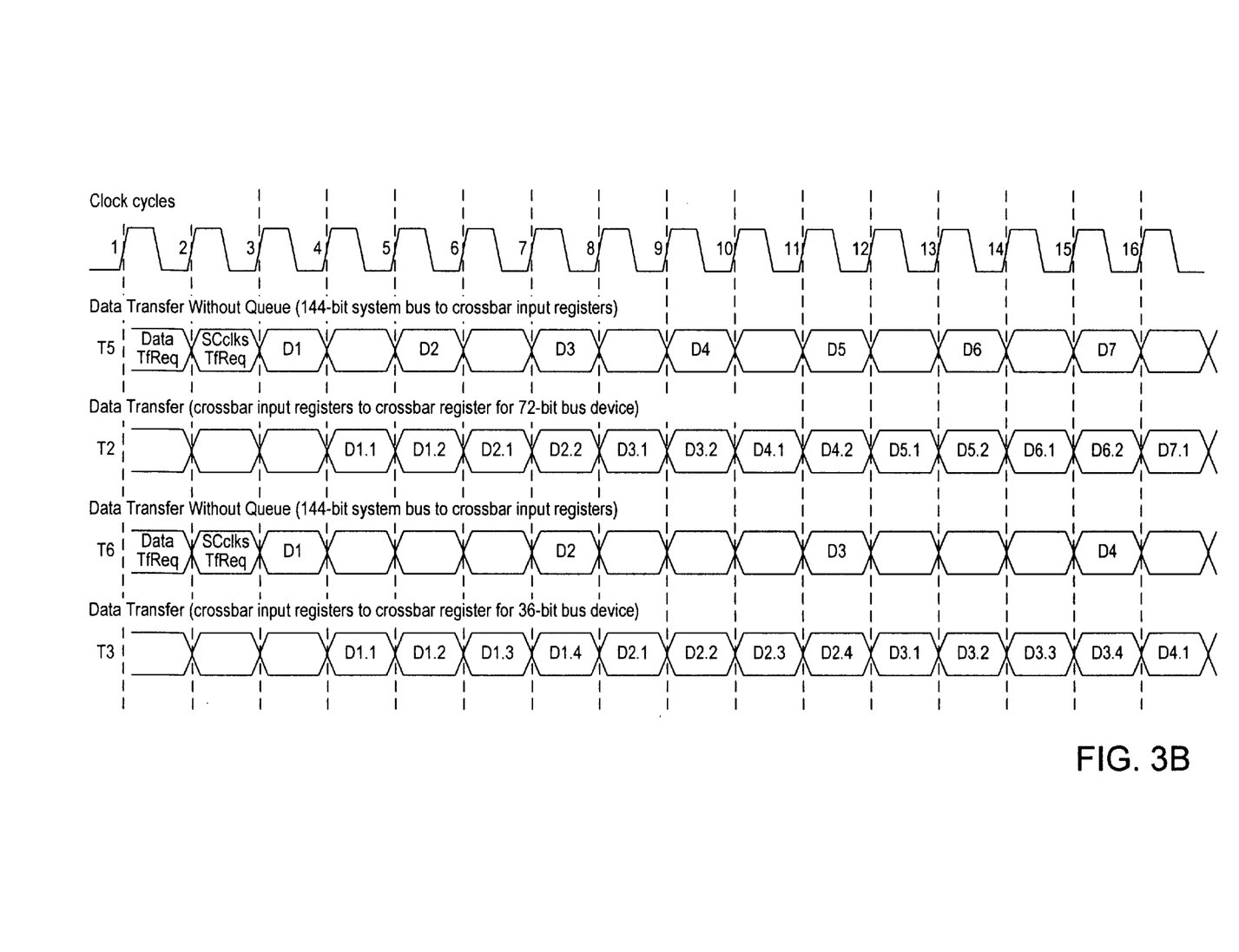
Figure 4:
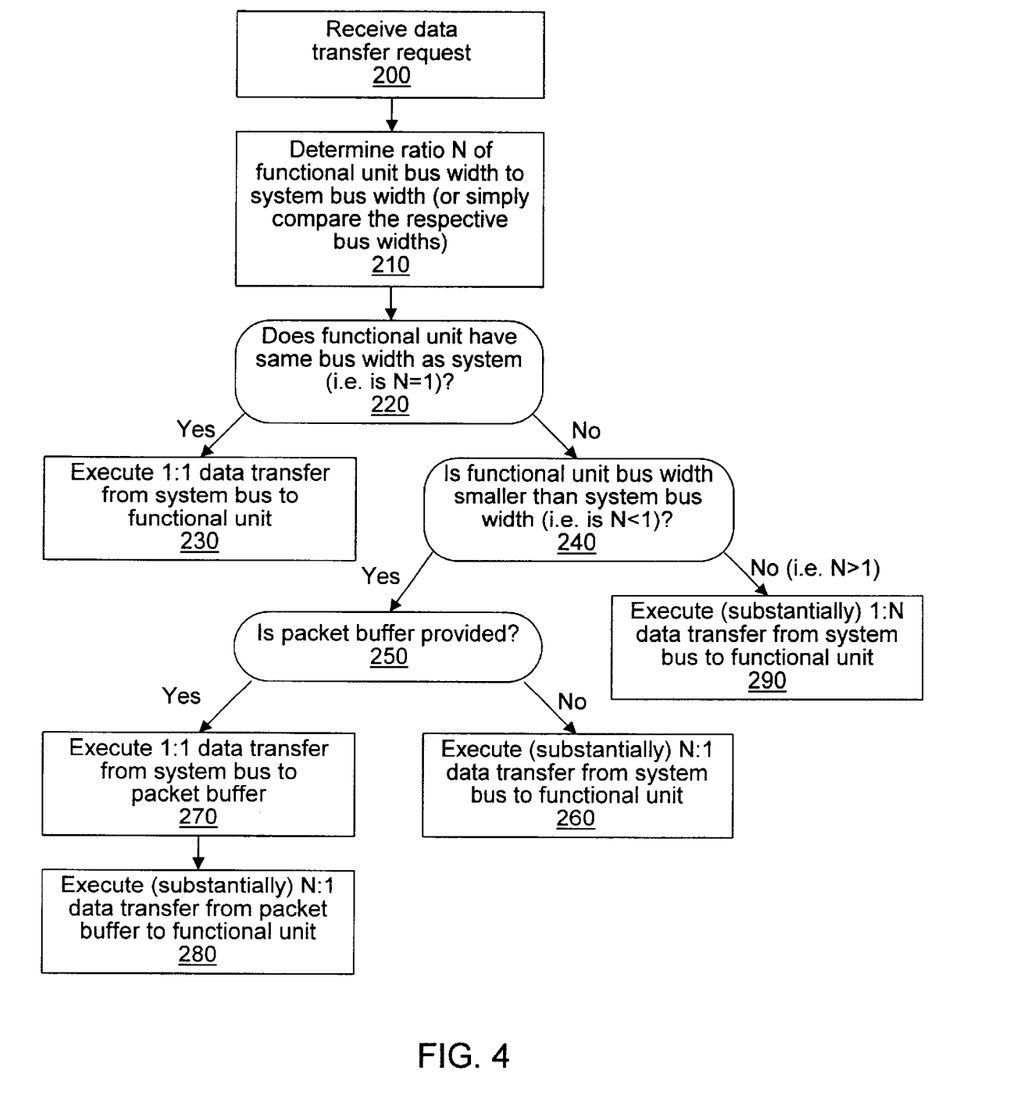
FIG. 4 is a flow chart showing a method of implementing the invention.

Referring now to FIGS. 3–3A and 4, at clock cycle 1 (see FIG. 3) the system controller receives a data transfer request (box 200 of FIG. 4) from a master device—in this example, M1 shown in FIG. 2. At clock cycle 2, the SC 75 clocks in the request.

The SC 75 then determines (box 210) the width of the bus of the functional unit to which the transfer request is addressed, which may conveniently be expressed either as the absolute number (e.g. 72) of bits or, in the flow chart of FIG. 4, as a ratio of the functional unit bus width to the master (or system) bus width (box 210 of FIG. 4).

If the master bus width and functional unit bus width are the same (see box 220), then N=1, and the SC 75 executes a 1:1 data transfer from the master bus to the functional unit (box 230). For instance, memory Mem2 and Master M1 in FIG. 2 have databuses D5 and D2, respectively, which are 144 bits wide. In this case, each clock cycle drives one 144-bit packet onto the bus of the receiving device.

In any transfer, data transmission begins on the third clock cycle (see FIG. 3) from the master M1 to register R1, and thence is made available at the selected outputs of the MUX 95.

If Mem2 is the destination for the data, then the MUX outputs for R5 are selected. On the fourth clock cycle, then, the data is ready for input into Merm2. This corresponds to transfer mode T1 in FIG. 3, wherein for each clock cycle one entire 144-bit word is transferred. Thus, at clock cycle 4, word D1 is transferred into Mem2. In the meantime, word D2 is one clock cycle in the transfer process behind word, D1, so at clock cycle 5 word D2 is transferred to Mem2, and so on.

At box 240 in FIG. 4, if N<1—i.e., if the functional unit bus width is smaller than the master bus width—then the method proceeds to box 250. If not (i.e. N>1 and the functional unit bus width is larger than the master bus width), then the method proceeds to box 290, and the SC 75 executes a 1:N data transfer from the master bus to the functional unit.

In the case of a 1:N transfer (i.e. from a smaller bus to a larger bus), at each clock cycle a complete (here, 144-bit) word is transferred, but it takes N cycles before the fill width (here, N*144) of the functional unit bus is reached (and in general the functional unit words are N times as large as the master bus words). This would be the case, for example, for a transfer to memory Mem1, which has a 288-bit bus.

This corresponds to transfer method T4 of FIG. 3, where on clock 3, word D1 is transferred to register R4, and on clock 4, word D2 is transferred. In one embodiment, R4 may buffer one (144-bit) word and be filled every other cycle, while on the alternate cycles an additional word is passed through to master M1 along with the word that has been buffered. I.e., it is advantageous to "fly" every second word through the register R4 on the second of the two transfer clock cycles (here, clock 5 in FIG. 3), while at the same time transferring a buffered word. This way, at clock 4 the first word D1 is stored in register D4, and at clock 5 word D1 is provided to the first 144 bits of the input bus of Mem1, while at the same time word D2 is passed ("flown") through register R4 and provided at the second 144 bits of the bus to Mem1.

The method branch proceeding to box 250 in FIG. 4 reflects the case of functional units with smaller data buses than that of the system, and transfers in this case can proceed in one of two ways, with possible variations—the commonality being that transfers of partial words are effected between the master bus and the functional unit. A packet buffer (i.e. a queue in the appropriate output register R4–R7, or equivalently in the appropriate input register R1–R3) may be provided, in which case (box 250) the method proceeds to box 270, and a 1:1 data transfer between the master bus and the packet buffer is executed. In this case, the master M1 is caused by the SC 75 to transfer the data across 144-bit bus D1 to the crossbar 92. As the queue is filled, partial words are transferred from the crossbar to the destination slave. For instance, if slave S1 is the destination, then (see mode 72 in FIG. 3), one-half of a word is transferred per clock cycle (N=½), so a ½:1 data transfer is achieved. At clock 4, then, the first half D1.2 of word D1 is transferred to S1; and in clock 5, the second half D1.2 is transferred. At clock 6, the first half D2.1 of the second word is transferred, and so on. It will be seen from FIG. 3 that each word (D1.1+D1.2; D2.1+D2.2; etc.) takes two clock cycles to be transferred to slave S1.

Note that at the sixteenth clock cycle in FIG. 3, fourteen words have been transferred to the crossbar 92, but only six-and-a-half have been transferred to the slave S1—i.e. substantially a 1:2 transfer rate is achieved, because of the limited bandwidth of the slave. The surplusage of words transferred to the crossbar to words reaching the slave can continue until the crossbar (packet) queue is full.

A similar situation arises if the transfer is to slave S2; here, N=¼, and the transfer of data from the packet buffer to the functional unit takes four times as long as the transfer from the master bus to the packet buffer. This corresponds to transfer method T3 in FIG. 3, where the partial-word designations are analogous to those of transfer method T1 (i.e. D1.1+D1.2+D1.3+D1.4 comprise the first full-width word, etc.). Here, the queue fills faster than in the case of transfer mode T2, since the bandwidth of slave S2 is only one-half that of slave S1.

If the embodiment of the invention does not include a packet buffer (i.e. packet queues), then the method proceeds to box 260, and the SC 75 executes a substantially N:1 data transfer to the functional units. This corresponds to the timing diagram of FIG. 3A. In this case, unless the functional unit itself is provided with the necessary bus adapter (i.e. its own data buffer with a full-width input data bus)—which is one option—then the SC 75 must delay transfer of the words to a rate that the functional unit can accommodate. In the example of slave S1, the SC must transfer word D1 to the crossbar at cycle 3. The input registers R1–R3 are 144 bits wide, so that full words can be accepted at the crossbar. However, register R6 is only 72 bits wide, and the delay control 110 manages partial-word transfers to the register R6 to accommodate the limited bandwidth of slave S1.

Thus, in FIG. 3A, transfer mode T5, at clock 3 word D1 is transferred to the crossbar, and it is transmitted to S1 at clocks 4 and 5. At clock 4, no transfer to the crossbar is carried out, because it is not ready for it. At clock 5, word D2 can be transferred, and passed on to S1 at clocks 6 and 7; and so on. A substantially 2:1 data transfer is achieved; i.e. it takes two cycles to transfer every (full-width, here 144-bit) word to S1.

The case is similar for transfers to the slave S2, but the rate is half as fast; see modes T6 and T3 in FIG. 3A Logic may readily be implemented to carry out the necessary partial-word transfers.

Note that the rates of transfer to the slaves with smaller bus widths than the master bus width is the same regardless of whether a packet buffer is used; the main difference is the inter-leaved idle clock cycles in the embodiment without queues (though those cycles may be used by the SC for other tasks, there will probably be some inefficiencies).

In the case of transfers to a memory Mem2 or other device with a bus having a width the same as that of the master bus, mode T1 in FIG. 3 represents the transfer sequence; it is a simple 1:1 transfer without or without packet buffering. (The register R5 may be a single word or many words deep.)

Accordingly, devices with any size bus widths (smaller or larger) may be connected to a master bus of a given size. The functional unit's bus width need not divide evenly into the width of the master bus. For example a 64-bit bus device may be connected to a 144-bit bus, and the delay control and/or packet buffer can be designed to effect the correct transfer rate to the connected device. In this case, the transfers are not achieved at precisely an N:1 rate, but the rate will be substantially N:1, i.e. fairly close assuming the words are transferred without any intervening data or actions. Thus, a 144-bit word can be transferred to a 64-bit bus in two transfers of 64 bits each, followed by a transfer of 16 bits. The remaining 48 bits in the last word transferred to the device can either be garbage bits (and therefore wasted), or the device can be provided with circuitry (logic, buffers or latches, etc.) and/or software to receive the first 48 bits of the next word, and so on. In this case, a true N:1 transfer ratio can be achieved.

The system of the invention is applicable to transfer of any data, instructions or the like that have a structure of bits delivered over a data bus of a predetermined first width to a device coupled to the bus and having a device bus of a predetermined second width, where the second width is equal or not equal to the first width.

What is claimed is:

1. A computer system comprising:
    a first master device coupled to a first bus and configured to convey data of a first predetermined width on said first bus;
    a first slave device coupled to a second bus and configured to receive data of a second width on said second bus;
    a second slave device coupled to a third bus and configured to receive data of a third width on said third bus, wherein said first predetermined width is different from at least said second width or said third width;
    a data path switching unit coupled to said first bus, said second bus and said third bus and configured to selectively transfer data from said first bus to either of said second bus or said third bus depending upon a data path control signal; and
    a system controller configured to determine said second width of said second bus and said third width of said third bus, wherein said system controller is configured to generate said data path control signal depending upon said second width of said second bus and said third width of said third bus.

2. The computer system as recited in claim 1, wherein said data path switching unit is further configured to partition a data word received upon said first bus in a given cycle into a first plurality of sub-portions that are individually conveyed upon said second bus, wherein a total number of said first plurality of sub-portions is dependent upon said control signal.

3. The computer system as recited in claim 2, wherein said data path switching unit is further configured to partition said data word received upon said first bus in a given cycle into a second plurality of sub-portions that are individually conveyed upon said third bus, wherein a total number of said second plurality of sub-portions is dependent upon said control signal, wherein said first plurality of data words is different than said second plurality of data words.

4. The computer system as recited in claim 3, wherein said second width and said third width are smaller than said first width.

5. The computer system as recited in claim 1, wherein said data path switching unit is further configured to combine a first data word received upon said first bus in a first cycle with a second data word received upon said first bus in a second cycle into a third data word that is conveyed upon said second bus dependent upon said control signal.

6. The computer system as recited in claim 5, wherein said second width is larger than said first width.

7. The computer system as recited in claim 1, wherein said system controller is further configured to determine said second width of said second bus and said third width of said third bus in response to a predetermined trigger initiated during an operation of said computer system.

8. The computer system as recited in claim 1, wherein said data is conveyed on said first bus using the entirety of said first width of said first bus, regardless of said second width and said third width.

9. The computer system as recited in claim 1, wherein said data path switching unit is further configured to communicate data from said first bus to said second bus without transferring data through said third bus, and wherein said data path switching unit is configured to communicate data packets from said first bus to said third bus without transferring data through said second bus.

10. The computer system as recited in claim 1, wherein said system controller is further configured to control said transfer of data from said first bus to either of said second bus or said third bus by causing said master device to wait a given number of cycles dependent upon said second width of said second bus and said third width of said third bus.

11. The computer system as recited in claim 1 further comprising:
    a first buffer connected between said first bus and said second bus configured to store a first plurality of data words received from said first bus;
    a second buffer connected between said first bus and said third bus configured to store a second plurality of data words received from said first bus; and
    a buffer control coupled to said first buffer and said second buffer and configured to transfer said first plurality of data words to said second bus and said second plurality of data words to said third bus in sets corresponding to said second width and said third width, respectively.

12. A method for transferring data from a master device on a first bus having a first width to second bus having a second width or a third bus having a third width, said method comprising:
    receiving a request to transfer said data from said first bus to said second bus or to said third bus;
    determining said second width and third width in response to a predetermined trigger; and
    generating a data path control signal depending upon said second width of said second bus and said third width of said third bus by providing a data path control signal dependent upon said second width and said third width;
    transferring said data from said first bus to said second bus or to said third bus in response to said data path control signal.

13. The method as recited in claim 12 further comprising partitioning a data word received upon said first bus in a given cycle into a first plurality of sub-portions and individually conveying first plurality of sub-portions upon said second bus, wherein a total number of said first plurality of sub-portions is dependent upon said control signal.

14. The method as recited in claim 13 further comprising partitioning said data word received upon said first bus in a given cycle into a second plurality of sub-portions and individually conveying said second plurality of sub-portions upon said third bus, wherein a total number of said second plurality of sub-portions is dependent upon said control signal, wherein said first plurality of data words is different than said second plurality of data words.

15. The method as recited in claim 14, wherein said second width and said third width are smaller than said first width.

16. The method as recited in claim 12, further comprising combining a first data word received upon said first bus in a first cycle with a second data word received upon said first bus in a second cycle into a third data word and conveying said third data word upon said second bus dependent upon said control signal.

17. The method as recited in claim 16, wherein said second width is larger than said first width.

18. The method as recited in claim 12, wherein said data is conveyed on said first bus using the entirety of said first width of said first bus, regardless of said second width and said third width.

19. The method as recited in claim 12, wherein said data is transferred from said first bus to said second bus without using said third bus, and wherein said data is transferred from said first bus to said third bus without using said second bus.

20. The method as recited in claim 12 further comprising controlling said transfer of data from said first bus to either of said second bus or said third bus by causing said master device to wait a given number of cycles dependent upon said second width of said second bus and said third width of said third bus.

21. The method as recited in claim 12 further comprising:

storing a first plurality of data words received from said first bus in a first buffer connected between said first bus and said second bus;

storing a second plurality of data words received from said first bus in a second buffer connected between said first bus and said third bus; and transferring said first plurality of data words to said second bus and said second plurality of data words to said third bus in sets corresponding to said second width and said third width, respectively.

* * * * *